United States Patent [19]

Hwang et al.

[11] Patent Number: 4,631,318
[45] Date of Patent: Dec. 23, 1986

[54] POLYMERIC MOLECULAR COMPOSITES

[75] Inventors: Wen-Fang Hwang; Donald R. Wiff, both of Beavercreek; Thaddeus E. Helminiak, Oakwood, all of Ohio

[73] Assignee: Research Corporation, New York, N.Y.

[21] Appl. No.: 473,214

[22] Filed: Mar. 8, 1983

[51] Int. Cl.⁴ ............................................. C08L 77/00
[52] U.S. Cl. ..................................... 525/432; 525/417; 525/420
[58] Field of Search ......................... 525/432, 420, 417

[56] References Cited

U.S. PATENT DOCUMENTS 4,207,407 6/1980 Helminiak et al. ................. 525/425
4,228,218 10/1980 Takayanagi et al. ................. 525/92

FOREIGN PATENT DOCUMENTS

WO7901029 11/1979 PCT Int'l Appl. ................. 525/432

Primary Examiner—John C. Bleutge
Assistant Examiner—A. L. Carrillo
Attorney, Agent, or Firm—Scully, Scott, Murphy & Presser

[57] ABSTRACT

Polymeric molecular composites at the molecular level that are analogous to chopped fiber composite comprising reinforcing rigid rod heterocyclic polymer dispersed in a thermoplastic polymer matrix are disclosed. A process for the preparation thereof and laminates comprised of plies of these composites are also disclosed.

19 Claims, 1 Drawing Figure

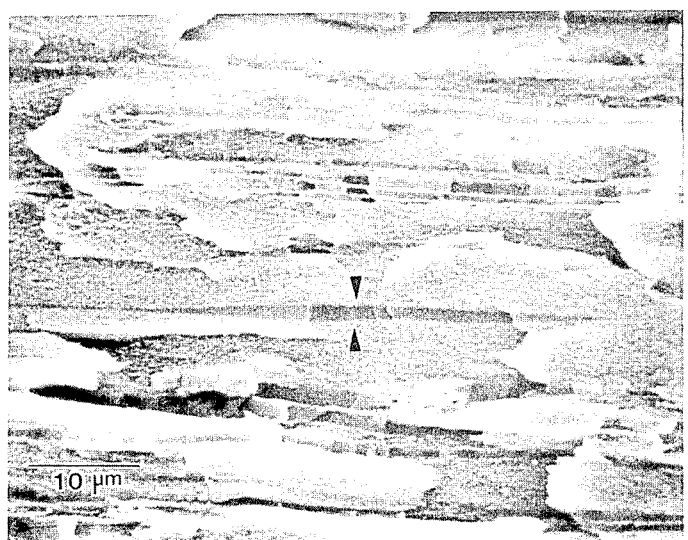
FIG.1 SEM Micrograph of the Freeze-Fractured Surface of Laminated 30/70 PPBT/Nylon Molecular Composite Films.

POLYMERIC MOLECULAR COMPOSITES

The invention described herein was made in the course of work under a grant or award sponsored in part by the U.S. Air Force Department.

BACKGROUND OF THE INVENTION

This invention relates to polymeric composites of rigid rod aromatic heterocyclic polymers and flexible thermoplastic polymers and a method for the preparation of composite fibers and films with rigid rod-like aromatic heterocyclic polymers molecularly dispersed in a continuous flexible coil thermoplastic polymeric matrix.

Recent developments in the synthesis of rigid rod-like and flexible coil aromatic heterocyclic polymers has created the opportunity to develop a new class of polymeric structural materials. Of special interest are polymeric composites composed of these rigid rod and flexible coil polymers. The intent is to reinforce the flexible coil polymers with the rigid rod polymers and to fabricate these composites into fiber and film forms with similar or superior properties to that of conventional chopped fiber composites. U.S. Pat. No. 4,207,407 discloses polymeric composites of rod-like aromatic heterocyclic polymers and coil like aromatic heterocyclic polymers and their method of preparation.

As is well known, the strength and durability of the composite is largely dependent upon the existence of an extensive long lasting load-transferring interface between the reinforcing constituent and the matrix. If this interfacial area is small the strength of the composite would be greatly impaired. This is the case when the reinforcing rigid rod polymers segregate into large aggregates with sizes in the micron range. Then, due to a smaller specific surface area (area per unit mass) a high strength, durable reinforced composite cannot be obtained. The intent is then to eliminate this reinforcing constituent-matrix interfacial problem. A need exists, therefore, for fabricating molecular composites with the reinforcing rigid rod polymers molecularly dispersed in a continuous flexible coil polymer matrix having superior strength, dimensional stability and durability.

Since the reinforcing rigid rod polymer is aromatic heterocyclic polymers, they are not amenable to conventional melt processing. They can only be fabricated into useful articles such as fibers and films through solution processing which requires strong mineral or organic acid solvents. Hence, the solution behavior of the two polymer constituents in a common solvent is of critical importance in determining how efficiently the rigid rod-like polymer molecules can be dispersed in the flexible coil-like polymer matrix when fabricated through solution processing.

Studies of the solution morphology of polymer blends of rigid rod and flexible coil heterocyclic polymers have indicated there exists, for any composition of these polymers, a critical concentration point, $C_{cr}$, at ambient conditions. Above a critical concentration, the ternary solution containing rigid rod polymer, flexible coil heterocyclic polymers and solvent segregates into two coexisting phases, one optically anisotropic (liquid crystalline) and the other isotropic. The anisotropic domains are composed primarily of rigid rod polymers, while the isotropic matrix retains almost all the flexible coil heterocyclic polymers. When these polymer blends are processed above their critical concentration point at ambient conditions, a macroscopically phase separated composite system is obtained in which rigid rod polymer aggregates are dispersed in the flexible coil heterocyclic polymer matrix.

From a mechanics of composites point of view, this phase segregation (aggregate formation) behavior in a composite system is a detrimental feature. The aggregates do not have a large enough aspect ratio (ratio of length to diameter) as compared to chopped fibers in a conventional composite system. Additionally, the aggregates offer too small a specific interfacial area between them and the matrix to achieve the high rigidity and strength required for a structural material. In short, the reinforement efficiency of a molecular composite is greater than that of a conventional chopped-fiber composite.

SUMMARY OF THE INVENTION

Accordingly, it is one object of the present invention to provide polymeric molecular composites comprised of reinforcing rigid rod heterocyclic polymer molecules molecularly dispersed in a flexible coil thermoplastic polymer matrix, particularly useful in the fabrication of high strength and dimensionally stable composites.

Another object of this invention is to provide composite materials at the molecular level that are analagous to a chopped fiber composite.

Still another object of the present invention is to provide molecular composites comprised of rigid rod polymers in a thermoplastic matrix having better solvent resistance and higher usage temperature.

A further object of this invention is to provide laminates comprised of layers of polymeric molecular composites comprised of reinforcing rigid rod heterocyclic polymer molecules molecularly dispersed in a thermoplastic matrix.

A still further object of the present invention is to provide a process for the fabrication of composite fibers and films with rigid rod polymer molecules molecularly dispersed in a thermoplastic flexible coil polymer matrix.

Other objects and advantages of the invention will become apparent to those skilled in the art upon consideration of the accompanying disclosure.

BRIEF DESCRIPTION OF THE DRAWING

FIG. 1 is a SEM micrograph of the freeze-fractured surface of laminated 30/70 PPBT/Nylon molecular composite films.

DETAILED DESCRIPTION OF THE INVENTION

The processing technique of the present invention involves fabricating molecular composite fibers and films from any ternary solution containing any composition of rigid rod polymer, flexible coil thermoplastic polymer and solvent at lower than its corresponding critical concentration point via a shearing and/or elongation-coagulation route. The principle concept is to freeze-in, through the quick coagulation process, the high dispersity of rigid rod-like polymer molecules in the still isotropic ($C < C_{cr}$) solution as it is being extruded from the spinnerette or die, or subsequently elongate the partially coagulated solution to achieve orientation. This technique offers the advantages of molecular disperity as ensured by a transparent isotropic solution, high orientability of rigid rod-like molecules in the highly viscous medium (flexible coil thermoplastic polymer + solvent), and much more flexibility in the processing than either the vacuum casting and/or the precipitation technique. As a result, molecular composite fibers and films of rigid rod polymers molecularly dispersed in a flexible coil thermoplastic polymer matrix can be readily fabricated which possess similar or superior properties to conventional chopped fibers composites. Furthermore, these molecular composites can be tailored to a desired combination of properties such as modulus, strength, and elongation through the variations during the processing. Molecular composite films thus prepared can then be laminated by compression-molding into bulkier components for structural applications.

In one embodiment, the invention lies in the molecular composite fibers and films comprised of rigid rod aromatic heterocyclic polymers molecularly dispersed (specifically, for example, the size of segregated domains of these molecules is less than 50 Å, however larger segregated domains are contemplated herein provided that the aspect ratio of the reinforcement entity is sufficient to translate properties to the matrix) in a flexible coil thermoplastic polymer matrix. These composites, generally can contain any composition of the two types of polymers, for example, 1 to 90 weight percent of the rigid rod polymer, preferably 10 to 60 weight percent, of the rigid rod polymer.

In a more specific embodiment, the invention resides in a new process for fabricating molecular composite fibers and films, sequentially consisting of the following steps:

1. Determine the critical concentration point at any particular temperature of a ternary solution prepared by dissolving any composition (by weight percent) of rigid rod polymers and flexible coil thermoplastic polymers in a common good solvent, (such as methanesulfonic acid) by slowly titrating an originally biphasic, stir opalescent of known concentration with solvent until a point is reached at which the solution becomes isotropic and stir-opalescence has ceased; the critical concentration point of the ternary solution is defined as the maximum concentration of polymers in a solvent at which it is still optically isotropic at any particular temperature and pressure. At this point, the ternary solution is optically transparent.
2. Prepare a ternary solution with a concentration, for example, at about 0.1 to one weight percent lower than its corresponding critical concentration point, depending upon the rheological characteristics of each individual polymer in the solvent, to ensure that no extension (or pressure) induced phase-separation or segregation occurs in the solution;
3. Transfer the isotropic solution to the solution reservoir in a piston-type extruder under an inert atmosphere;
4. Extrude the solution through a single-hole spinnerette (diameter may vary) at a constant speed directly into a coagulation bath of deionized water or other washing medium such as weakly acidic medium, in the case of fiber processing; or in the case of films, extrude the solution through a flat film die (dimensions may vary) at a constant rate onto a polished drum the bottom half of which is immersed in a coagulation bath as above. The drum rotates at the same speed as the extrusion rate (no elongational drawing applied) or at a faster speed than the extrusion rate (elongational drawn orientation applied);
5. Collect the extruded coagulated film or fiber on a collecting reel immersed in a bath as above e.g. water. They are subsequently drawn between this reel and another reel rotating at a faster speed (post processing elongational, also immersed in bath e.g. water, orientation applied);
6. Store these films or fibers in a bath, for example, under running water for at least 3 days to leach out the residual solvent, by monitoring the acidity of water bath until it becomes neutral, furthr washing using methanol, or other water remaining medium such as other alcohols;
7. Dry the wet films or fibers at room condition or mild temperature condition (e.g. <30° C.) to prevent bubbling and drastic chemical reactions due to residual solvent or water in the films or fibers at later high temperature post treatment;
8. Further dry the films or fibers at 100°-200° C. in a vacuum chamber before subsequent heat treatments;
9. Hot drawing the dry films or fibers by passing them through a hot oven or over a "hotshoe" (at temperature above the Tg of composites while under tension (may vary) and preferably in an inert atmopshere. Best results are obtained when the draw ratio is at its maximum. This improves the molecular packing of these specimens and the degree the orientation which improves the physical and mechanical properties of the composites.

The rod-like aromatic heterocyclic polymers used in the practice of the present invention exhibit 'para' ordered geometry. Examples of such polymers, which are described in the literature, include those consisting essentially of repeating units having the following formula:

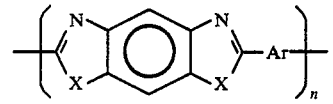

or

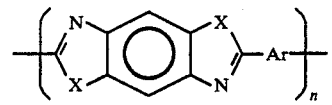

wherein X is NH, Nφ, O or S, where φ is phenyl, and wherein Ar is

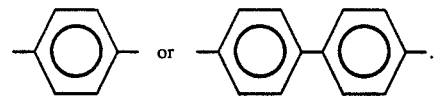

(1,4 phenylene)     (4,4'-biphenylene)

In the foregoing formulas, n is an integer equal to the number of recurring units and has a value such that the polymers have an intrinsic viscosity of as least 5 dl/g, preferably 10 to 40, inclusive, as determined in methanesulfonic acid at 30° C. Examples of rod-like polymers that can be used include those disclosed in U.S. Pat. No. 4,108,835 incorporated by reference herein.

Flexible coil polymers used in combination with the rigid rod polymers are any thermoplastics, which will be dissolved in a common acidic solvent of rigid rod polymers without being chemically degraded. Illustrative examples of suitable thermoplastics include those consisting essentially of repeating units having the following formulas:

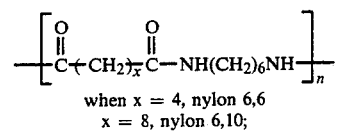

when x = 4, nylon 6,6
x = 8, nylon 6,10;

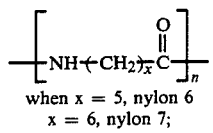

when x = 5, nylon 6
x = 6, nylon 7;

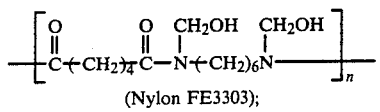

(Nylon FE3303);

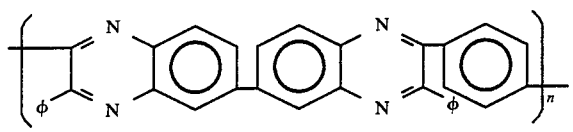

wherein n is an integer having a value such that the polymer has an intrinsic viscosity of about 1 to 5 dl/g as determined in methanesulfonic acid at 30° C. Other thermoplastic polymers are also contemplated herein. These others include, for example, any thermoplastic polymer which may be dissolved in a common solvent with the aforementioned rigid rod aromatic heterocyclic polymer. Molecular weights of these thermoplastics should be sufficient to provide solution integrity to provide sufficient entanglement density to result in a good film or fiber. An idealized solution morphology is one where rigid rod polymers are molecularly (or small bundles of molecules) dispersed in an entangled flexible coil network. This solution has integrity and high processibility with regard to orientability during wet stretching in the coagulation bath and hot drawing during heat treatment. This processing condition depends upon the intrinsic molecular characteristic, i.e., molecular weight between entanglements and rigidity of the matrix polymers.

A more complete understanding of the invention can be obtained by referring to the following illustrative examples which are not intended, however, to be unduly limitative of the invention.

EXAMPLE 1

30 parts by weight/poly-para-phenylenebenzobisthiazole (PPBT) (intrinsic viscosity (IV)=31)/70 parts by weight Nylon FE3303 ($M_n \cong 11,000$) composite fibers, were prepared in accordance with the present invention (nine steps as described previously). The solvent was methanesulfonic acid (MSA). A single hole 10 mil spinnerette was used. The concentration of polymers in this ternary solution was 3.1 wt.% at 24°-26° C. Tensile properties are summarized in Table 1.

EXAMPLE 2

60 parts by weight/poly-para-phenylenebenzobisthiazole (PPBT) (intrinsic viscosity (IV)=31)/40 parts by weight Nylon FE3303 ($M_n \cong 11,000$) composite fibers were prepared by the same procedure as Example 1. The concentration of polymers in this ternary solution was 2.8 wt.% was compared to its critical concentration point of 3.0 wt.% at 24°-26° C. Tensile properties are summarized in Table 1.

EXAMPLE 3

30 parts by weight/poly-para-phenylenebenzobisthiazole (PPBT) (intrinsic viscosity (IV)=31)/70 parts by weight Nylon (Zytel 42) composite fibers were prepared by the same procedure as Example 1. The concentration of polymers in this ternary solution was 2.65 wt.% as compared to its critical concentration point of 2.9 wt.% at 24°-26° C. Tensile properties are summarized in Table 1.

EXAMPLE 4

30 parts by weight/poly-para-phenylenebenzobisthiazole (PPBT) (intrinsic viscosity (IV)=31)/70 parts by weight poly-p-phenylenequinoxaline (PPQ) composite fibers were prepared by the same procedure as Example 1. The concentration of polymers in this ternary solution was 4.0 wt.% as compared to its critical concentration point of 4.2 wt.% at 24°-26° C. Tensile properties are summarized in Table 1.

TABLE 1

| Polymer & Composites | Young's Modulus M, psi (GPa) | Tensile Strength T.S. psi (mPa) | Elongation at Break $E_B$ (%) |
|---|---|---|---|
| Nylon 6,6 (Zytel 42*) | 410,000 (2.83) | 12,400 (85.5) | 90 |
| 30/70 PPBT/Nylon 6,6 (Zytel 42) | 645,000 (4.45) 2.6 × $10^6$ (18.0) | 28,700 (198) 40,000 (276) | 24.3 (as spun) 3 |
| 60/40 PPBT/Nylon 6,6 | 11.4 × $10^6$ (79) | 111,000 (766) | 1.1 |
| Amorphous Nylon (FE3303*) | 399,000 (2.75) | 14,100 (97.3) | 150 |
| 30/70 PPBT/Nylon FE3303 | 3.4 × $10^6$ (31.0) 6.0 × $10^6$ (41.4) | 42,600 (294) 67,000 (462) | 25 (as spun) 1.4 |
| 60/40 PPBT/Nylon FE3303 | 11.6 × $10^6$ (80.1) | 127,300 (880) | 1.4 |

*Both Zytel 42 and FE3303 are DuPont Trade Names.

EXAMPLE 5

30/70 PPBT (IV=31)/Nylon FE3303 ($M_n \cong 11,000$) composite films were prepared in accordance with the present invention (nine steps as described previously). The solvent was MSA. A custom designer coat-hanger die was used. The concentration of polymers in this ternary solution was 3.1 wt.%. After leaching the residual acid in the films, composite films were dried in a vacuum oven for at least 24 hrs. Many plies (dependent upon the desired thickness of the final product) of thin film were then compression molded into a single sheet at 150°-250° C. (Tg of these composite films was 130° C.) for several hours. The molded sheet was then freeze-fractured in liquid nitrogen and examined by a Scanning Electron microscope (SEM). The SEM micrograph is shown in FIG. 1. As can be seen in contrast to conventional fiber composite laminations the fracture of molecular composite is a cohesive one without delamination. Similar results were obtained for 30/70 PPBT (IV-31)/PPQ compression-molded sheet.

Some of the above specimens were characterized by Differential Scanning Calorimetry (DSC) technique to determine its glassy transition temperature (Tg). The results in comparison with the neat thermoplastics are summarized in Table 2. Solvent resistance of molecular composites as compared to neat thermoplastics is summarized in Table 3.

TABLE 2
IMPROVEMENT OF THERMAL PROPERTIES OF THERMOPLASTIC MOLECULAR COMPOSITES

| Polymer and Composites | Glassy Transition Temperature Tg (°F.) |
| --- | --- |
| Nylon FE3303 | 212 |
| 30/70 PPBT/Nylon FE3303 | 266 |
| PPQ-412 | 680 |
| 30/70 PPBT/PPQ-412 | >842* |

*Up to the limit of instrument (842° F.), no Tg was observed.

TABLE 3
IMPROVEMENT OF SOLVENT RESISTANCE OF MOLECULAR COMPOSITE

| Polymer & Composite | Solvent | | |
| --- | --- | --- | --- |
| | m-cresol | benzyl alcohol | chloroform |
| Nylon 6,6 | dissolve | dissolve | — |
| 30/70 PPBT/Nylon 6,6 | no effect | no effect | — |
| PPQ-412 | — | — | dissolve |
| 30/70 PPBT/PPQ412 | — | — | no effect |

As can be seen from the data in Table 1, 2 and 3 the present invention provides a unique method for producing high strength and high modulus thermoplastic composite fibers and films with enhanced chemical resistance and elevated usage temperature. These properties represent significant improvement over that of conventional chopped-fiber composites as shown in Table 4. Furthermore, as has been demonstrated the thermoplastic molecular composite films, in analogy to lamination of prepregs in the conventional fiber composite technology, can be compression-molded into bulkier component for structural application.

98% anhydrous methane sulfonic acid (MSA) from Aldrich Chemical Company. PPBT polymers (IV=31 dl/g in 2% MSA) with calculated Mw≅40,000 g/mole were obtained from Standford Research International. High Tg amorphous poly-p-phenylenequinoxaline (PPQ-412, Tg=359° C., IV=1.73 dl/g) polymer was obtained from Whittaker Corp. Two commercial amorphous Nylons (FE3303), with Mn≅12,000 and 8,000 g/mole, were obtained from DuPont. Except drying, all polymers were used as received.

Thus, as is evident from the foregoing, the polymeric molecular composites of the present invention comprised of rigid rod polymer molecularly dispersed in a coil thermoplastic matrix have superior impact and fracture strength over that of conventional macroscopic chopped-fiber and continuous filament composites. Under an external load the probability of the reinforcing rigid rod molecules deflecting a crack growth in the flexible matrix is higher, and the creation of failure centers in the interface between reinforcing elements and matrix is lower in a molecular composite with the same weight (or volume) composition. For practical structural applications, these advantages are enormous.

As will be evident to those skilled in the art, modification of the present invention can be made in view of the foregoing disclosure without departing from the spirit and scope of the invention.

We claim:

1. A polymeric molecular composite comprising, based on the total weight of said composite, a mixture of about 30 to 60 weight percent of an aromatic heterocyclic rigid rod polymer dispersed in about 70 to 40 weight percent of a continuous flexible coil-like thermoplastic polymer matrix,
said coil-like thermoplastic polymer being a polyamide having a structural formula selected from the group consisting of

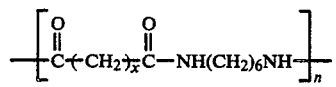

wherein x is 4 or 8,

TABLE 4
COMPARISONS OF TENSILE PROPERTIES BETWEEN THERMOPLASTIC MOLECULAR COMPOSITES AND OTHER UNIAXIALLY ALIGNED CHOPPED-FIBER REINFORCED THERMOPLASTICS*

| Reinforcement | Matrix | $v_f$** | Young's Modulus E (GPa) | T.S. (mPa) | $E_B$ (%) | Aspect Ratio of Reinforcement |
| --- | --- | --- | --- | --- | --- | --- |
| PPBT | PPQ-412 | 0.3 | 17.5 | 355 | 4.1 | 400*** |
| PPBT | Nylon 6.6-Zytel 42 | 0.25 | 18.0 | 276 | 3.0 | 400 |
| PPBT | Nylon-FE3303 | 0.25 | 41.4 | 462 | 1.4 | 400 |
| PPBT | Nylon-FE3303 | 0.5 | 80.1 | 880 | 1.4 | 400 |
| *Graphite | PE | 0.3 | 19.4 | 101 | 0.55 | 1250 |
| *Graphite | PE | 0.5 | 20.0 | 115 | 0.66 | 1250 |
| *PRD-49 | Nylon 12 | 0.3 | 12.0 | 232 | 3.0 | 815 |
| *PRD-49 | Nylon 12 | 0.5 | 24.2 | 510 | 3.7 | 815 |
| *Graphite | PMMA | 0.3 | 21.8 | 152 | 1.28 | 1250 |
| *Graphite | PMMA | 0.5 | 33.2 | 361 | 0.75 | 1250 |

*B. F. Blumentritt, B. T. Vu and S. L. Cooper, Polym. Eng. & Sci., 14, 633 (1974)
**Volume fraction of reinforcement
***Calculated In Table 4, solution processing of the molecular composite fibers and films of PPBT/thermoplastic followed the herein described procedure. The solvent used was

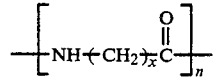

wherein x' is 5 or 6, and

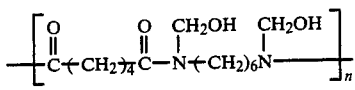

wherein n is an integer having a value such that the coil-like polymer has an intrinsic viscosity of about 1 to about 5 dl/g as determined in methanesulfonic acid at 30° C., and said aromatic heterocyclic rigid rod polymer comprising repeating units having a structural formula selected from the group consisting of

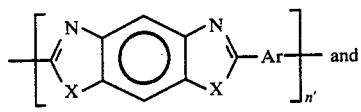

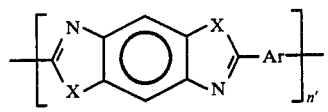

wherein X is NH, N$\phi$, $\phi$, S, where $\phi$ is phenyl, and Ar is

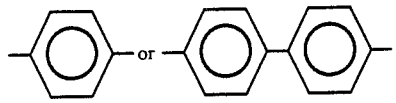

and n' is an integer having a value such that the rigid rod polymer has an intrinsic viscosity of about 10 to 40 dl/g as determined in methanesulfonic acid at 30° C.

2. The polymeric composite of claim 1 wherein the mixture comprises about 30 percent of the rigid rod polymer and about 70 weight percent of the flexible coil-like thermoplastic matrix.

3. The polymeric composite of claim 1 wherein the mixture comprises about 40 weight percent of the rigid rod polymer and about 60 weight percent of the flexible coil-like thermoplastic matrix.

4. The polymeric molecular composite of claim 1 wherein said aromatic heterocyclic rigid rod polymer is poly-para-phenylenebenzobisthiazole.

5. A laminate comprised of layers of a polymeric molecular composite comprising a mixture of about 30 to 60 weight percent of an aromatic heterocyclic rigid rod polymer dispersed in about 70 to 40 weight percent of a continuous flexible coil-like thermoplastic polymer matrix, based on the total weight of said composite, said coil-like thermoplastic polymer being a polyamide having a structural formula selected from the group consisting of

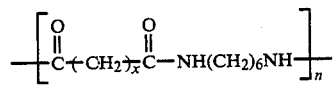

wherein x is 4 or 8,

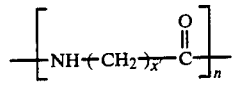

wherein x' is 5 or 6, and

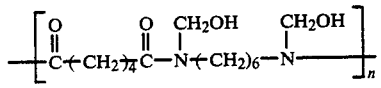

wherein n is an integer having a value such that the coil-like polymer has an intrinsic viscosity of about 1 to about 5 dl/g as determined in methanesulfonic acid at 30° C., and said aromatic heterocyclic rigid rod polymer comprising repeating units having a structural formula selected from the group consisting of

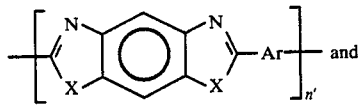

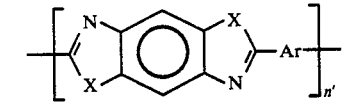

wherein X is NH, N$\phi$, $\phi$, S, where $\phi$ is phenyl, and Ar is

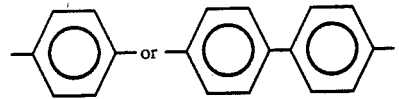

and n' is an integer having a value such that the rigid rod polymer has an intrinsic viscosity of about 10 to 40 dl/g as determined in methanesulfonic acid at 30° C.

6. The laminate of claim 5 wherein the coil-like thermoplastic polymer comprises repeating units having a structural formula consisting of

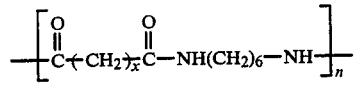

wherein x is 4 or 8.

7. The laminate of claim 5 wherein said aromatic heterocyclic rigid rod polymer is polyparaphenylenebenzobisthazole.

8. A process for the preparation of a composite film or fiber comprising the steps of:
(i) dissolving an aromatic heterocyclic rigid rod polymer and a flexible coil-like thermoplastic polymer in a common solvent at a concentration less than the critical concentration point of the solution;
(ii) extruding the solution resulting from step (i) into a liquid bath for removing said solvent;
(iii) collecting the extruded film or fiber resulting from step (ii) and washing said extruded film or fiber in a liquid bath to remove further solvent;

(iv) drying the wet film or fiber from step (iii) at a temperature of less than about 30° C.;
(v) hot forming the dry film or fiber by passing the same through an oven at a temperature above the Tg of the composite; and
(vi) cooling the composite at ambient temperature, said composite comprising about 30 to 60 weight percent of said aromatic heterocyclic rigid rod polymer and about 70 to 40 weight percent of said flexible coil-like thermoplastic polymer, based on the total weight percent of said composite, and
said coil-like thermoplastic polymer being a polyamide having a structural formula selected from the group consisting of

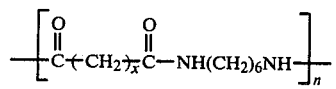

wherein x is 4 or 8,

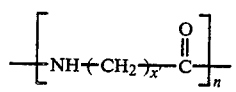

wherein x' is 5 or 6, and

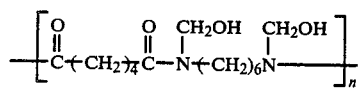

wherein n is an integer having a value such that the coil-like polymer has an intrinsic viscosity of about 1 to about 5 dl/g as determined in methanesulfonic acid at 30° C., and
said aromatic heterocyclic rigid rod polymer comprising repeating units having a structural formula selected from the group consisting of

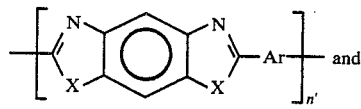 and

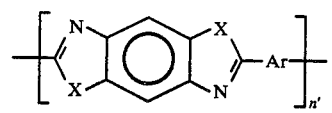

wherein X is NH, Nφ, φ, S, where φ is phenyl and Ar is

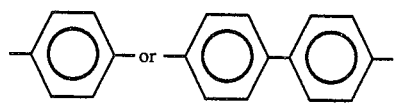

and where n' is an integer having a value such that the rigid rod polymer has an intrinsic viscosity of about 10 to 40 dl/g as determined in methanesulfonic acid at 30° C.

9. The process of claim 8 wherein, in step (i) thereof, the aromatic heterocyclic rigid rod polymer and the flexible coil-like thermoplastic polymer are at a concentration of about 0.1 to about 1% less than the critical concentration point of the solution.

10. The process of claim 8 wherein said liquid bath in step (ii) is deionized water.

11. The process of claim 8 wherein the solvent is removed in step (iii) to a concentration of less than about 2-3% of the film or fiber.

12. The process of claim 8 wherein said common solvent in step (i) is methanesulfonic acid.

13. A polymeric molecular composite prepared by the process of claim 8.

14. A polymeric molecular composite as in claim 1 wherein said aromatic heterocyclic rigid rod polymer comprises repeating units having a structural formula selected from the group consisting of

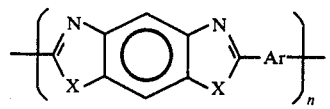

and

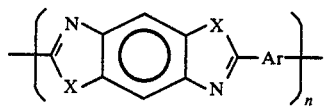

wherein X is NH, Nφ, φ, S, where φ is phenyl, and Ar is

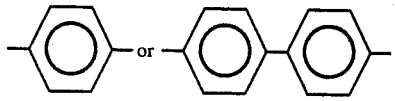

and wherein n is an integer having a value such that the rigid rod polymer has an intrinsic viscosity of at least 5 dl/g as determined in methanesulfonic acid at 30° C.,
and the flexible coil-like thermoplastic polymer comprises repeating units having a structure selected from the group consisting of

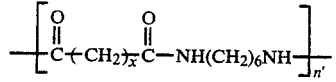

wherein x is 4 or 8,

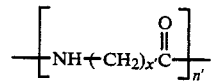

wherein x' is 5 or 6, and

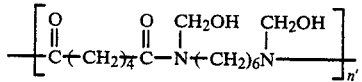

wherein n' is an integer having a value such that the coil-like polymer has an intrinsic viscosity of about 1 to about 5 dl/g as determined in methanesulfonic acid at 30° C.

15. A polymeric molecular composite as in claim 14 wherein said coil-like thermoplastic polymer has the structural formula

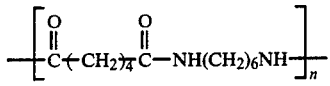

16. A polymeric molecular composite as in claim 14 wherein said coil-like thermoplastic polymer has the structural formula

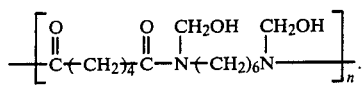

17. The laminate of claim 7 wherein said coil-like thermoplastic polymer has the structural formula

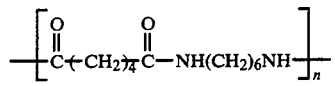

18. The laminate of claim 7 wherein said coil-like thermoplastic polymer has the structural formula

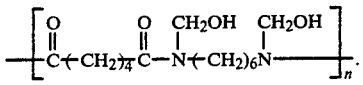

19. The composite of claim 13 wherein said aromatic heterocyclic rigid rod polymer is poly-para-phenylenebenzobisthiazole.

* * * * *